W. D. MATTHEWS.
Churn.
No. 59,428. Patented Nov. 6, 1866.
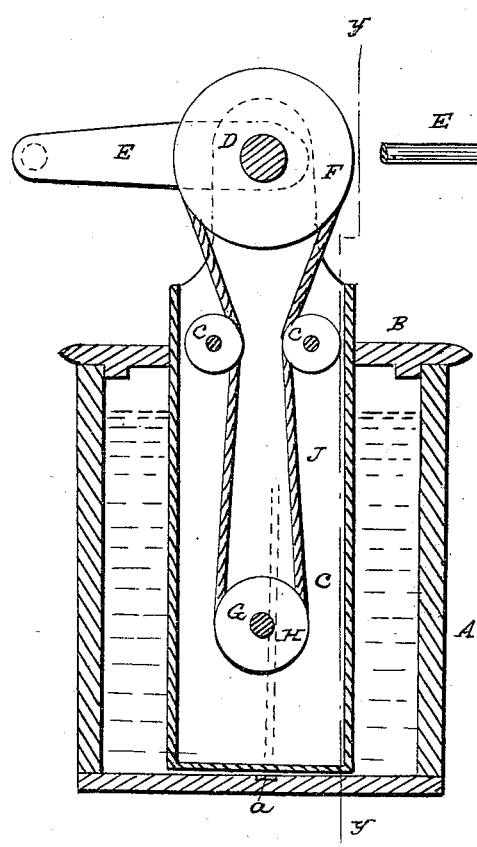
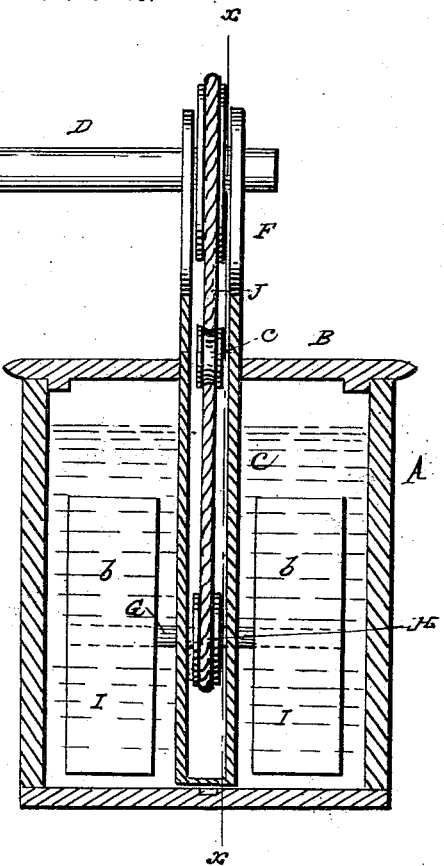
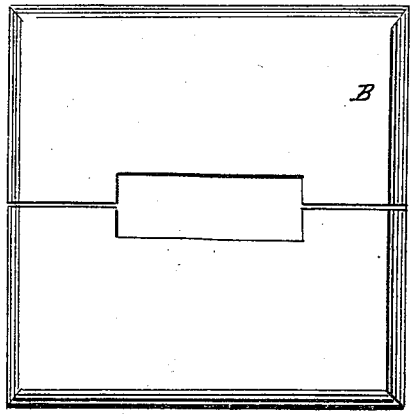
WITNESSES:
INVENTOR.

UNITED STATES PATENT OFFICE.

WILLIAM D. MATTHEWS, OF COLUMBIA, TENNESSEE.

IMPROVEMENT IN CHURNS.

Specification forming part of Letters Patent No. 59,428, dated November 6, 1866.

*To all whom it may concern:*

Be it known that I, W. D. MATTHEWS, of Columbia, in the county of Maury and State of Tennessee, have invented a new and Improved Churn; and I do hereby declare that the following is a full, clear, and exact description thereof, which will enable others skilled in the art to make and use the same, reference being had to the accompanying drawings, forming a part of this specification, in which—

Figure 1 is a vertical section of my invention, taken in the line $x\ x$, Fig. 2; Fig. 2, a vertical section of the same, taken in the line $y\ y$, Fig. 1; Fig. 3, a plan or top view of the cream-box.

Similar letters of reference indicate like parts.

This invention consists of a dasher composed of rotary beaters, arranged and operated in a novel manner, as hereinafter set forth, whereby a very simple, efficient, and economical churn is obtained, and one which admits of the dasher being readily removed from the cream-receptacle after the butter has been produced, in order that the butter may be gathered and taken from the cream-receptacle with the greatest facility.

A represents the cream-receptacle, which may be of rectangular or other suitable form, and provided with a tight lid or cover, B.

C represents a vertical box, of rectangular form and quite narrow. This box is fitted in the cream-receptacle A, and has a pin, $a$, in its lower end, which is stepped in the bottom of the cream-receptacle A, the upper part of said box extending through the lid or cover B, and having a shaft, D, passing horizontally through its upper end, said shaft having a crank, E, at one end, and a pulley, F, upon it, which is in the upper part of the box C.

Through the lower part of the box C a shaft, G, passes horizontally, said shaft having a pulley, H, upon it within the box, and two rotary beaters, I I, upon it, which are at the outer side of the box C. These beaters are composed of radial blades $b$, two or more being used for each beater.

Within the upper part of the box C there are placed two pulleys, $c\ c$, which serve as guides for a band, J, which passes around the pulley F on shaft D and around the pulley H on shaft G.

From the above description it will be seen that when the shaft D is rotated a rotary motion will be communicated to the beaters I I, which, in consequence of revolving in the cream, soon causes the butter to be produced.

After this has been accomplished the lid or cover B is removed from the cream-receptacle and the box C raised out from the same, and the butter may be gathered and taken from the receptacle with the greatest facility.

This dasher may be used in any kind of a cream-receptacle to which a close lid or cover may be applied. The dasher may be readily cleaned or washed, and there are no parts liable to get out of repair or become deranged by use.

The beaters, shaft, and pulleys may be of wood or metal. I do not confine myself to any particular material.

I claim as new and desire to secure by Letters Patent—

A churn provided with a dasher composed of one or more rotary beaters attached to a horizontal shaft or axis, which passes through a box fitted vertically within the cream-receptacle and inclosing the driving mechanism, substantially as herein shown and described.

The above specification of my invention signed by me this 28th day of August, 1866.

WM. D. MATTHEWS.

Witnesses:
WM. M. SULLIVAN,
HENRY HARRIS.